United States Patent
Servet

(10) Patent No.: US 8,578,814 B2
(45) Date of Patent: *Nov. 12, 2013

(54) BICYCLE STEM WITH AN ADJUSTABLE TILT

(75) Inventor: Sébastien Servet, Nevers (FR)

(73) Assignee: Look Cycle International, Nevers (FR)

( * ) Notice: Subject to any disclaimer, the term of this patent is extended or adjusted under 35 U.S.C. 154(b) by 759 days.

This patent is subject to a terminal disclaimer.

(21) Appl. No.: 12/768,067

(22) Filed: Apr. 27, 2010

(65) Prior Publication Data

US 2011/0107872 A1    May 12, 2011

(30) Foreign Application Priority Data

Apr. 30, 2009   (FR) ..................................... 09 52877

(51) Int. Cl.
  *B62K 21/16* (2006.01)
  *B62K 21/22* (2006.01)

(52) U.S. Cl.
  USPC ........................................................ 74/551.3

(58) Field of Classification Search
  USPC ................ 74/551.1, 551.3–551.8; 403/374.3, 403/374.4, 367, 110; 280/279
  IPC ............................................ B62K 21/16,21/22
  See application file for complete search history.

(56) References Cited

U.S. PATENT DOCUMENTS

| | | | |
|---|---|---|---|
| 5,327,798 A | 7/1994 | Lerch, Jr. | |
| 5,404,769 A * | 4/1995 | Kao | 74/551.3 |
| 5,437,208 A * | 8/1995 | Cheng | 74/551.1 |
| 5,477,747 A | 12/1995 | Cheng | |
| 5,515,744 A | 5/1996 | Liao | |
| 5,842,385 A | 12/1998 | Su | |
| 6,058,800 A * | 5/2000 | Giard | 74/551.1 |
| 7,353,731 B2 * | 4/2008 | Lin | 74/551.7 |
| 8,177,249 B2 * | 5/2012 | Servet | 280/279 |
| 2005/0150321 A1 * | 7/2005 | Liao | 74/551.1 |
| 2009/0079160 A1 | 3/2009 | Lai | |

FOREIGN PATENT DOCUMENTS

CN    200992282    12/2007

OTHER PUBLICATIONS

French Search Report dated Nov. 9, 2009 from corresponding French application.

* cited by examiner

*Primary Examiner* — Thomas Diaz
(74) *Attorney, Agent, or Firm* — Young & Thompson

(57) ABSTRACT

The stem (1) is provided with elements (3) for attaching the stem to the upper end of a pivoting tube and elements (25) for attaching a handlebar to the stem. The rear attachment elements (3) include articulation members (8) that make it possible to adjust the tilt of the stem (1) and tightening elements (10, 11, 19, 21) that make it possible to lock the stem in an angular position. The tightening elements are of a semi-cylindrical shape extending crosswise into a housing (12) that has an opening (12') downward that makes it possible to insert the pivoting tube (4). The tightening elements at their upper and lower ends are provided with a receiving recess (13, 14) that is adapted to the pivoting tube and extend crosswise in the housing that has a cylindrical wall (15) cooperating with the first tightening element (10) so as to define the articulation members.

18 Claims, 3 Drawing Sheets

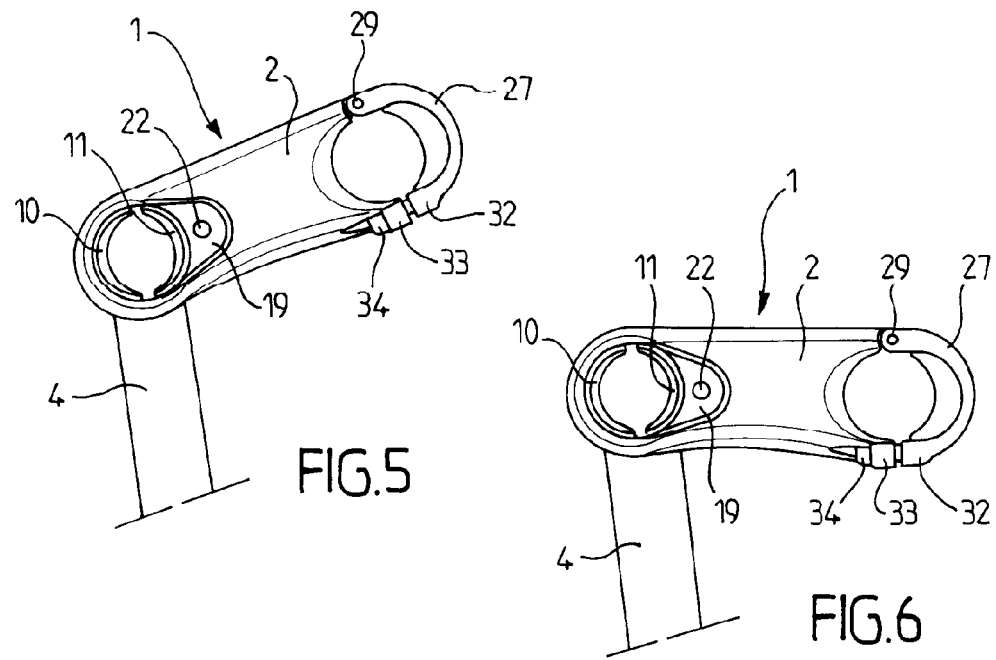
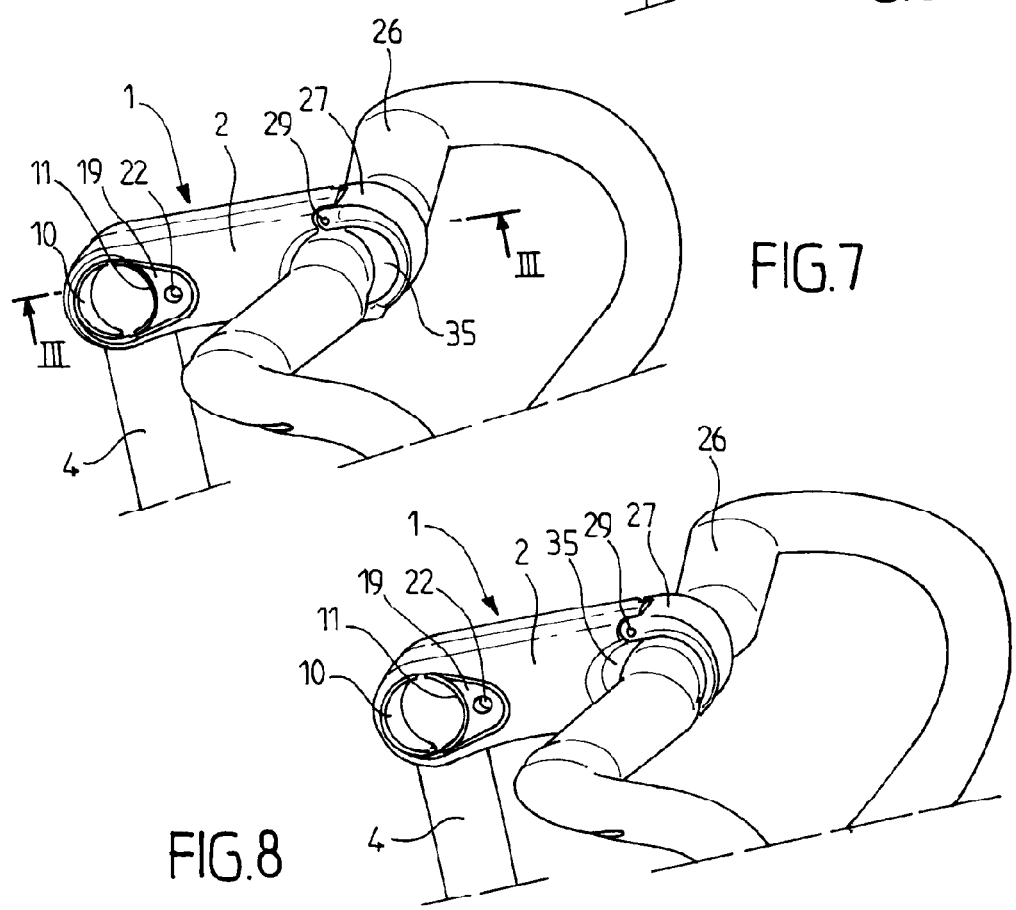

BICYCLE STEM WITH AN ADJUSTABLE TILT

BACKGROUND OF THE INVENTION

1. Field of the Invention

This invention relates to a bicycle stem with an adjustable tilt. At one of its ends, the stem carries the handlebar of the bicycle, and at its opposite end, it is attached to the upper portion of the pivoting tube that is mounted to rotate in the steering socket of the bicycle frame.

2. Description of the Related Art

The advantage of the adjustable tilt of the stem resides in the fact that it can be adapted to be convenient to individuals assuming a different position on the bicycle.

So as to be able to adjust the tilt of the stem, the means of attaching the stem to the pivoting tube comprise articulation means as is known from, for example, the publications CN200992282, U.S. Pat. Nos. 5,327,798 or 5,842,385.

A bicycle stem with an adjustable tilt in which two cylindrical tightening elements are used that extend axially inside a hole for receiving a pivoting tube at the end of the stem is also known from the publication US 2009/079160. These two tightening elements are provided with a respective convex hemisphere cooperating with a corresponding recess that is provided in a housing so as to form an articulation that makes it possible to adjust the tilt of the stem. However, this configuration is extremely complicated to implement, all the more so since the adjustment of the tilt is difficult to carry out due to the tightening of a screw that compresses the headset, thus creating significant friction between the hemispheres and the recesses of the stem. It will therefore be necessary to loosen the headset to adjust the tilt of the stem. Another drawback of this stem is that it does not allow the presence of streaks or serrations on the contact surfaces, which otherwise would allow better holding of the elements and an adjustment by indexing.

Thus, all of the known stems of this type are relatively complicated by their design and comprise a large number of parts to assemble, which leads to a heavy weight and a high cost and often also a loss of rigidity of the unit.

So as to implement an adjustment of the length of the stem to prevent, to a certain extent, producing a range of stems of different lengths, U.S. Pat. No. 5,842,385 also proposes housing the handlebar in an insert with an eccentric hole. However, the adjustment is relatively complicated to carry out since by rotating the insert, the angle of inclination of the stem is also modified.

Furthermore, the selection of the height of the conventional stems is carried out by cutting the pivoting tube to the desired length, and annular inserts are then placed between the stem and the steering tube. This height is thus adjustable by varying the number of inserts.

SUMMARY OF THE INVENTION

The purpose of the invention is to propose a bicycle stem with simplified adjustment of the tilt of the stem, which comprises very few parts and which provides an improved rigidity to the unit.

Another purpose of the invention is to propose a bicycle stem that comprises simple means for adjusting the length of the stem.

The object of the invention is a bicycle stem with an adjustable tilt, comprising a stem body of which one of the ends is provided with first means for attaching the stem at the upper end of a pivoting tube and of which the opposite end is provided with second means for attaching a handlebar to the stem, whereby said first attachment means comprise articulation means that make it possible to adjust the tilt of the stem and tightening means that make it possible to lock the stem in a desired angular position, whereby said tightening means comprise first and second tightening elements with an overall semi-cylindrical shape extending into a housing that has an opening directed downward so as to allow there the insertion of the pivoting tube, whereby said first and second tightening elements are provided at their respective upper and lower ends with a receiving recess that is adapted to the periphery of the pivoting tube, characterized by the fact that said first and second tightening elements extend crosswise into said housing that has an at least partially cylindrical wall cooperating with said first tightening element so as to define said articulation means together.

According to other characteristics of the invention:
   Said second tightening element is drawn toward said first tightening element by an element that forms a wedge that can move crosswise in said housing;
   Said element that forms a wedge has a cylindrical support surface that assumes the outside shape of said second tightening element;
   An element that forms a wedge is placed on two sides of the stem body and the two elements that form a wedge are connected to one another by a tightening screw;
   Said housing is open laterally from the two sides of the stem body;
   Said recesses for receiving said first and second tightening elements are extended upward or downward by a respective projecting flange that defines an enlarged support surface for the pivoting tube;
   Said flanges project into a groove of the housing in said at least one cylindrical portion of the latter so as to constitute crosswise locking means of said first and second tightening elements when the pivoting tube is inserted into the housing and tightened between said tightening elements;
   Said second attachment means comprise a U-shaped cap that is articulated to the stem body at one of its ends to be tilted over a recess that is provided at the front end of the stem body for receiving the handlebar so as to clamp the latter, and that at its opposite end carries first connecting means that can be connected to second connecting means that are provided on the stem body;
   The length of the stem can be modified using at least one crescent-shaped spacer that is placed in the shape of a U of the cap for obtaining a reduced length of the stem and in said recess for receiving the stem body at the front end to obtain a more significant length;
   A crescent-shaped spacer is placed on each lateral side of the stem body and the two spacers are connected to one another by male and female connecting elements that extend crosswise to be fitted into one another; and
   Said male and female elements are held in one another by ratcheting.

BRIEF DESCRIPTION OF THE DRAWING FIGURES

Other characteristics and advantages of the invention will emerge from the following description of a nonlimiting embodiment of the invention with reference to the accompanying figures in which:

FIGS. 5 and 6 are diagrammatic side views that show the stem according to the invention in two end positions on the pivoting tube;

FIG. 7 is a perspective view that illustrates the stem with a reduced length; and FIG. 8 is a perspective view that illustrates the stem with an increased length.

In the figures, the identical or equivalent elements will have the same references.

DETAILED DESCRIPTION OF THE INVENTION

Figure 2:
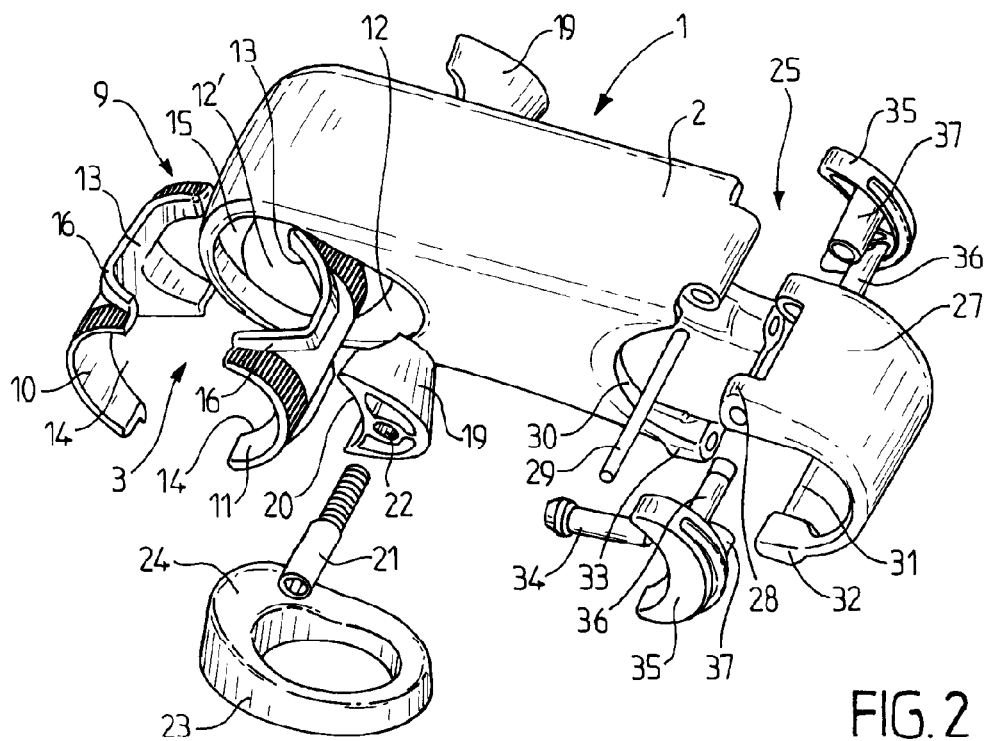
FIG. 2 is an exploded perspective view of the stem according to the invention.

The constituent elements of the stem 1 according to the invention are shown in FIG. 2.

Figure 1:
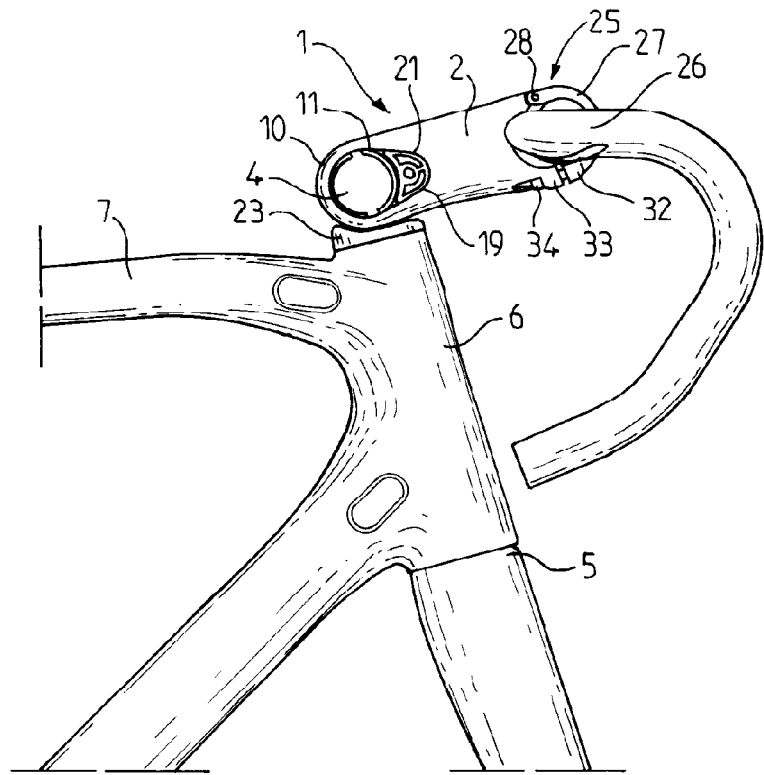
FIG. 1 is a partial side view of a bicycle that is equipped with a stem according to the invention.
Figure 3:
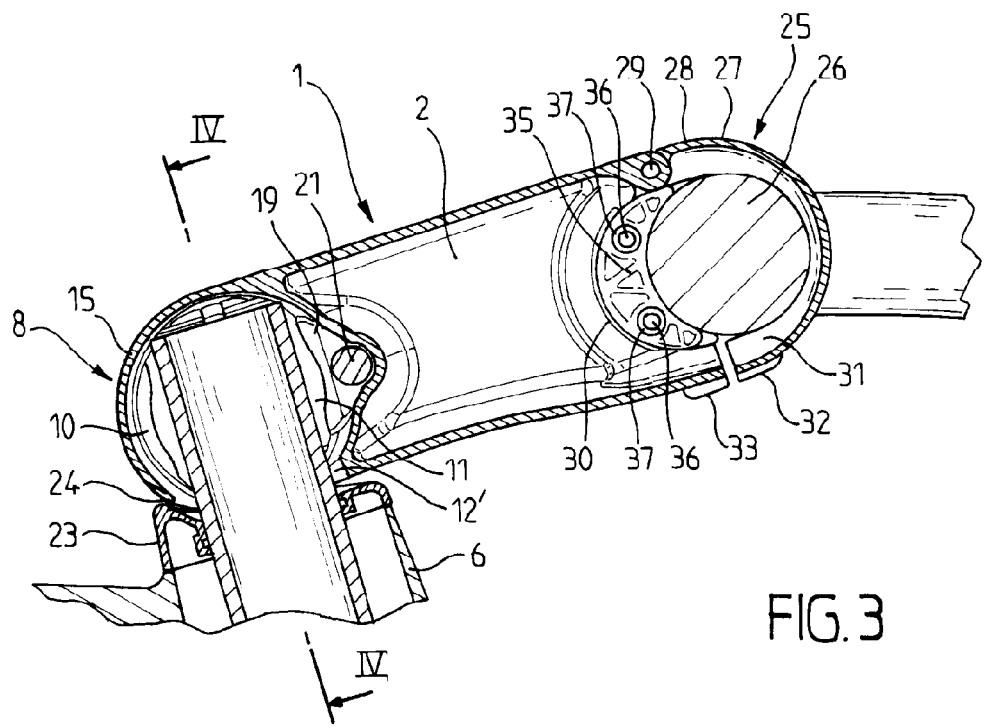
FIG. 3 is a longitudinal section of the stem along line III-III of FIG. 7, assembled and attached to a pivoting tube and carrying a handlebar.

The stem body 2, which is a hollow body that is preferably made of compressed carbon and that has the shape of a box with rounded ends, is visible there (see FIGS. 1 and 3).

The rear end of the stem body 2 is provided with first means 3 for attaching the stem 1 at the upper end of a fork pivoting tube 4 that in turn is attached to the fork head 5 and is mounted to pivot in the steering tube 6 that is part of the frame 7 of the bicycle.

The attachment means 3 also comprise articulation means 8 that make it possible to adjust the tilt of the stem 1 as well as tightening means 9 that make it possible to lock the stem 1 in a desired position.

According to an important characteristic of the invention, the tightening means 9 comprise a first tightening element (10) and a second tightening element (11) of an overall semi-cylindrical shape that extends crosswise into a housing 12 that is provided at the rear end of the stem 1.

The housing 12 has an opening 12' that is directed downward so as to make it possible to insert the pivoting tube 4. The first and second tightening elements 10, 11 are provided at their respective upper and lower ends with a receiving recess 13 or 14 that is adapted to the periphery of the pivoting tube 4. The housing 12 has an at least partially cylindrical wall 15 that is able to work with the first tightening element 10 so as to define together the articulation means 8.

Figure 4:
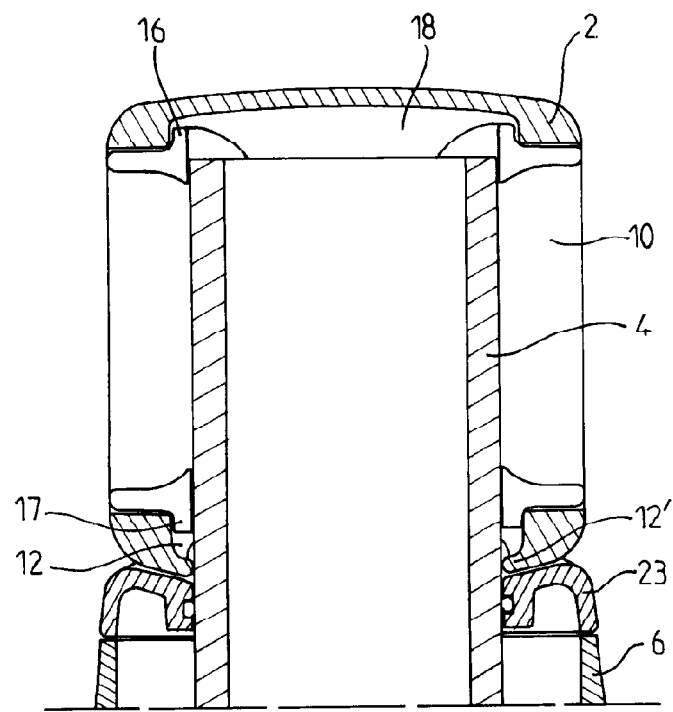
FIG. 4 is a crosswise section of the stem along line IV-IV of FIG. 3.

Furthermore, the receiving recesses 13, 14 that are provided in the first and second tightening elements 10, 11 are advantageously extended upward or downward by a respective projecting flange 16, 17 (see FIG. 4) for defining an enlarged support surface for the pivoting tube 4.

Advantageously, these projecting flanges 16, 17 project into a groove 18 of the housing 12 (see FIG. 4) so as to constitute crosswise locking means of the first and second tightening elements 10, 11 when the pivoting tube 4 is inserted into the housing 12 so as to rest against the wall of the upper and lower recesses 13, 14 of the first and second tightening elements 10, 11.

For the tightening of the pivoting tube 4 by the first and second tightening elements 10, 11, the second tightening element 11 is drawn toward the first tightening element by an element that forms a wedge 19 that can move crosswise in the housing 12.

This element that forms a wedge 19 has a cylindrical surface 20 that assumes the outside shape of the second tightening element 11. Preferably, and for a better balance, such an element that forms a wedge 19 is placed on two sides of the stem body 2, whereby these two elements that form a wedge are connected to one another by a tightening screw 21 that is inserted into a smooth through hole 22 for working with a tapping that is provided in the other element that forms a wedge, whereby this tapping is, for example, in the form of a screw (not shown) buried in the body of the latter.

For the assembly of the first and second tightening elements 10, 11, as well as two elements that form a wedge 19 inside the housing 12, the latter is open crosswise from the two sides of the stem body 2.

To attach the pivoting tube 4 to the stem 1, first the tightening screw 21 is loosened to move the elements that form a wedge 19 toward the outside by separating them from one another so as to create a certain play between the first and second tightening elements 10, 11 so as to facilitate the insertion of the pivoting tube 4 into the housing 12.

Then, it is only necessary to insert the pivoting tube 4 into the housing 12 until it just abuts against the wall of the housing to adjust the tilt of the stem 1 using articulation means 8 and to tighten the first and second tightening elements 10, 11 around the pivoting tube 4 by manipulating the tightening screw 21 that moves the elements that form a wedge 19 crosswise to the inside so as to draw the second tightening element 11 in the direction of the first tightening element 10.

Of course, the opening 12' of the housing 12 has an elongated shape in the axial direction of the stem body 2 so as to make possible a certain angular travel of the stem 1 as is illustrated in FIGS. 5 and 6, whereby FIG. 5 shows the upper end position, and FIG. 6 shows the lower end position of the stem, with a continuous adjustment between these two positions.

The length of the pivoting tube 4 is determined during the manufacturing, but the height of the stem 1 above the steering tube 6 can be adjusted using an annular insert 23 that is placed between these two elements. The frame can advantageously be provided with a set of inserts with different thicknesses that on one portion of their surface rotated upward have a curved shape that is adapted to the outside shape of the portion of the stem body 2 that defines the articulation. In this way, the support surface of the stem 1 on the insert 23 becomes more significant, which contributes to the stability of the unit.

The front end of the stem body 2 is provided with second means 25 for attaching a handlebar 26 to the stem 1. These second attachment means 25 comprise a U-shaped cap 27 that at one of its ends 28 is articulated to the stem body 2 around an axis 29 to be tilted over a recess 30 that has a shape that is adapted for receiving the handlebar 26, whereby this recess is provided at the front end of the stem body 2. At its opposite end 31, the U-shaped cap also has first connecting means 32 that can be connected to second connecting means 33 that are provided on the stem body. The first and second connecting means 32, 33 are connected to one another by a pair of attachment screws 34, one screw on each side.

According to the invention, the length of the stem can be modified using a crescent-shaped spacer 35 that is adapted to be placed in the shape of a U of the cap 27 for obtaining a reduced length of the stem 1 or in the receiving recess 30 at the end of the stem body 2 for obtaining a more significant length. Using this device, it is thus possible to move the handlebar 26 toward or away from the bicyclist.

Preferably, a spacer 35 of this type is placed on each lateral side of the stem body 2. The two spacers are connected to one another by male connecting elements 36 and female connecting elements 37 that extend crosswise toward the inside to work with one another by being fitted into one another. These spacers 35 are advantageously kept together by ratcheting male and female elements 36, 37.

Because the stem body 2 is housed in the receiving recess 30, with or without a spacer 35, after its assembly on the pivoting tube 4 and after having received the handlebar 26 that is closed on two sides, i.e., on one side by the second tightening element 11 and on the other side by the handlebar 26, an airtight housing is formed that is found virtually integrated in the frame 7, which makes possible a gain in rigidity but also a better appearance and a continuity of shapes.

Thanks to the invention, a bicycle stem is thus obtained that allows the adjustment of its height, its tilt and its length by extremely simple and reliable means.

Of course, the invention is not limited to the illustrated and described examples, and one skilled in the art will be able to find variants without thereby leaving the scope of the invention.

The invention claimed is:

1. A bicycle stem with an adjustable tilt, comprising:
a stem body having a first end and an opposite second end;
first means for attaching the stem at an upper end of a pivoting tube, the first means for attaching being provided at the first end, the first means for attaching comprising means for articulation configured to adjust the tilt of the stem and means for tightening that make it possible to lock the stem in a desired angular position;
second means for attaching a handlebar to the stem, the second means for attaching being provided at the second end,
wherein said means for tightening comprise first and second tightening elements with an overall semi-cylindrical shape extending into a housing that has an opening that is directed downward so as to allow insertion of the pivoting tube,
said first and second tightening elements are provided at their respective upper and lower ends with a receiving recess that is adapted to a periphery of the pivoting tube,
said first and second tightening elements extend crosswise into said housing that has an at least partially cylindrical wall cooperating with said first tightening element so as to define said means for articulation together, and
said second tightening element is drawn toward said first tightening element by an element that forms a wedge that can move crosswise in said housing.

2. The bicycle stem according to claim 1, wherein said element that forms a wedge has a cylindrical support surface that assumes the outside shape of said second tightening element.

3. The bicycle stem according to claim 2, wherein said element that forms a wedge comprises two elements that form wedges that are placed on two sides of the stem body, and the two elements that form a wedge are connected to one another by a tightening screw.

4. The bicycle stem according to claim 1, wherein said element that forms a wedge comprises two elements that form wedges that are placed on two sides of the stem body, and the two elements that form a wedge are connected to one another by a tightening screw.

5. The bicycle stem according to claim 1, wherein said housing is open laterally from two sides of the stem body.

6. The bicycle stem according to claim 1, wherein said receiving recesses of said first and second tightening elements are extended upward or downward by a respective projecting flange that defines an enlarged support surface for the pivoting tube.

7. The bicycle stem according to claim 1, wherein said second means for attaching comprise a U-shaped cap that is articulated to the stem body at one end of the U-shaped cap so as to be tilted over a recess that is provided at the second end of the stem body for receiving the handlebars so as to clamp the handle bars, and wherein an opposite end of the U-shaped cap carries first means for connecting that can be connected to second means for connecting that are provided on the stem body.

8. The bicycle stem according to claim 7, wherein a length of the stem can be modified using at least one crescent-shaped spacer that is placed in the shape of the U of the cap or into said receiving recess at the second end of the stem body.

9. The bicycle stem according to claim 8, wherein said at least one crescent-shaped spacer is placed on each lateral side of the stem body and wherein two of the spacers are connected to one another by male and female connecting elements extending crosswise to be fitted into one another.

10. A bicycle stem with an adjustable tilt, comprising:
a stem body having a first end and an opposite second end;
first means for attaching the stem at the upper end of a pivoting tube, the first means for attaching being provided at the first end, the first means for attaching comprising means for articulation configured to adjust the tilt of the stem and means for tightening that make it possible to lock the stem in a desired angular position;
second means for attaching a handlebar to the stem, the second means for attaching being provided at the second end,
wherein said means for tightening comprise first and second tightening elements with an overall semi-cylindrical shape extending into a housing that has an opening that is directed downward so as to allow insertion of the pivoting tube,
said first and second tightening elements are provided at their respective upper and lower ends with a receiving recess that is adapted to a periphery of the pivoting tube,
said first and second tightening elements extend crosswise into said housing that has an at least partially cylindrical wall cooperating with said first tightening element so as to define said means for articulation together,
said receiving recesses of said first and second tightening elements are extended upward or downward by a respective projecting flange that defines an enlarged support surface for the pivoting tube, and
said flanges project into a groove of the housing in said at least one cylindrical portion of the latter so as to constitute crosswise locking means of said first and second tightening elements when the pivoting tube is inserted into the housing and tightened between said tightening elements.

11. A bicycle stem with an adjustable tilt, comprising:
a stem body having a first end and an opposite second end;
a pivoting tube;
a first attachment device at an upper end of the pivoting tube, the attachment device being provided at the first end, the attachment device comprising
an articulation element configured to adjust the tilt of the stem, and
tightening elements configured to lock the stem in a desired angular position; and
a second attachment device configured for attaching a handlebar to the stem, the second attachment device being provided at the second end,
wherein said tightening elements comprise first and second tightening elements with an overall semi-cylindrical shape extending into a housing that has an opening that is directed downward so as to allow insertion of the pivoting tube, said first and second tightening elements are provided at their respective upper and lower ends with a receiving recess that is adapted to a periphery of the pivoting tube, said first and second tightening elements extend crosswise into said housing that has an at least partially cylindrical wall cooperating with said first tightening element so as to define said articulation element together, and said second tightening element is drawn toward said first tightening element by an element that forms a wedge that can move crosswise in said housing.

12. The bicycle stem according to claim 11, wherein said element that forms a wedge has a cylindrical support surface that assumes the outside shape of said second tightening element.

13. The bicycle stem according to claim 11, wherein said element that forms a wedge comprises two elements that form wedges that are placed on two sides of the stem body, and the two elements that form a wedge are connected to one another by a tightening screw.

14. The bicycle stem according to claim 11, wherein said housing is open laterally from two sides of the stem body.

15. The bicycle stem according to claim 11, wherein said receiving recesses of said first and second tightening elements are extended upward or downward by a respective projecting flange that defines an enlarged support surface for the pivoting tube.

16. The bicycle stem according to claim 15, wherein said flanges project into a groove of the housing in said at least one cylindrical portion of the latter so as to constitute crosswise a locking element of said first and second tightening elements when the pivoting tube is inserted into the housing and tightened between said tightening elements.

17. The bicycle stem according to claim 11, wherein said second attachment element comprises a U-shaped cap that is articulated to the stem body at one end of the U-shaped cap so as to be tilted over a recess that is provided at the second end of the stem body for receiving the handlebars so as to clamp the handlebars, and wherein an opposite end of the U-shaped cap carries a first connecting element that can be connected to a second connecting element that are provided on the stem body.

18. The bicycle stem according to claim 17, wherein a length of the stem can be modified using at least one crescent-shaped spacer that is placed in the shape of the U of the cap or into said receiving recess at the second end of the stem body.

* * * * *